United States Patent
Vedaraj et al.

(10) Patent No.: US 11,347,450 B1
(45) Date of Patent: May 31, 2022

(54) METHODS AND SYSTEMS FOR PROVIDING SECURE PRINTING WHILE PRINTING DOCUMENTS

(71) Applicant: XEROX CORPORATION, Norwalk, CT (US)

(72) Inventors: Ashok Jason Vedaraj, Chennai (IN); Thamizh Priyai Thamizhanandan, Chennai (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/213,100

(22) Filed: Mar. 25, 2021

(51) Int. Cl.
  *G06F 3/12* (2006.01)
(52) U.S. Cl.
  CPC .......... *G06F 3/1222* (2013.01); *G06F 3/1238* (2013.01)
(58) Field of Classification Search
  None
  See application file for complete search history.

(56) References Cited

U.S. PATENT DOCUMENTS

| | | | | |
|---|---|---|---|---|
| 2016/0381242 A1* | 12/2016 | Arakawa | ............ | H04N 1/00954 358/1.14 |
| 2019/0332338 A1* | 10/2019 | Ikazaki | ................. | G06F 3/1203 |
| 2020/0004479 A1* | 1/2020 | Aoki | ................... | H04N 1/00477 |
| 2020/0133594 A1* | 4/2020 | Parthasarathy | ......... | G10L 17/00 |
| 2021/0271768 A1* | 9/2021 | Imayoshi | ............... | G06F 3/1274 |

FOREIGN PATENT DOCUMENTS

JP 2007203735 A * 8/2007 ........... G06F 3/1222

OTHER PUBLICATIONS

English translation of Japanese Application 2007-021273, corresponding to Japanese Application Publication 2007-203735. (Year: 2007).*

* cited by examiner

Primary Examiner — Thomas D Lee

(57) ABSTRACT

The present disclosure discloses methods and systems for providing secure printing at a multi-function device. The method includes identifying whether a document received from a user requires secure printing. Then, the physical presence of the user and a user registered device near the multi-function device is detected. If both are present near the multi-function device, then printing of the document is initiated. Further, the presence of the user and a user registered device near the multi-function device is continuously tracked. Based on the presence of the user and the user registered device near the multi-function device, one of the following is performed—either continuing printing the document till completion and collection by the user or pausing printing the document when either the user or the user registered device is not detected near the multi-function device.

21 Claims, 11 Drawing Sheets

METHODS AND SYSTEMS FOR PROVIDING SECURE PRINTING WHILE PRINTING DOCUMENTS

BACKGROUND

Technical Field

The presently disclosed subject matter relates to the field of printing, and more particularly, to methods and systems for providing secure printing while printing documents.

Typically, users submit documents for printing via print drivers, Internet Services such as CentreWare Internet Services (CWIS). The submitted documents are received by printers or multi-function devices for printing. The printers start printing the document based on a print queue. In certain cases, the printers require user details such as password to initiate printing, especially when the document is a confidential document. After authenticating the user, the printers start printing. In cases where the document is a highly confidential document, the content or information in the document may be seen/read/stolen by other users near the printers, when the user is careless or moves away from the printers for a while. In such cases, the information given in the document gets leaked.

A number of solutions offering secure printing are available in the market, but these solutions fail to keep the information/content secure at the time of printing/while the document is getting printed at the printer. For example, the known solutions offer secure printing where the user simply requires entering username, password, passcode, employee id, or a combination, before releasing documents at the printer but these solutions fail to provide security while printing the document. Therefore, there is a need for improvised secure printing such that information given in the document or the whole document is not accessed/read/seen/stolen by other users while the document is printing at the printer.

SUMMARY

According to aspects illustrated herein, a method for securing documents while printing the documents is disclosed. The method is implemented at a multi-function device. The method includes receiving a document for printing from a user. Then, it is identified whether the document requires secure printing. Based on the identification, the user is authenticated to initiate printing of the document. Then, the presence of the user near the multi-function device is detected using a first method while printing the document and the presence of the user registered device near the multi-function device is further detected using a second method while printing the document. Based on the detection of the presence of the user and the user registered device, performing one of the following: pausing printing the document when either the presence of the user or the presence of the user registered device is not detected near the multi-function device; and continue printing the document till completion and collection by the user, when both the presence of the user and presence of the user registered device are detected near the multi-function device.

According to further aspects illustrated herein, a method for secure printing at a multi-function device is disclosed. The method includes identifying whether a document received from a user requires secure printing. Then, tracking of the user and a user registered device is initiated, here tracking includes detecting the physical presence of the user near the multi-function device and detecting the presence of a user registered device near the multi-function device. Based on the presence of the user and the presence of the user registered device near the multi-function device, printing the document is initiated. The presence of the user and the user registered device near the multi-function device is continuously tracked. Based on the presence of the user and the user registered device, either (i) continuing printing the document till completion and collection by the user or (ii) pausing printing the document.

According to further aspects illustrated herein, a multi-function device for securing documents while printing the documents, is disclosed. The multi-function device includes a controller, a first sensor and one or more second sensors. The controller is for identifying whether a document requires secure printing; based on the identification, authenticating a user to initiate printing of the document; initiating printing of the document; continuously tracking the presence of the user and a user registered device near the multi-function device, based on an input from a first sensor and the one or more second sensors; based on the tracking, performing one of the following: pausing printing the document when either the presence of the user or the presence of the user registered device is not detected near the multi-function device; and continuing printing the document till completion and collection by the user, when both the presence of the user and the presence of the user registered device are detected near the multi-function device. The multi-function device further includes the first sensor for detecting the presence of the user near the multi-function device while the document is printing; and the one or more second sensors for detecting the presence of the user registered device near the multi-function device while the document is printing.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1:
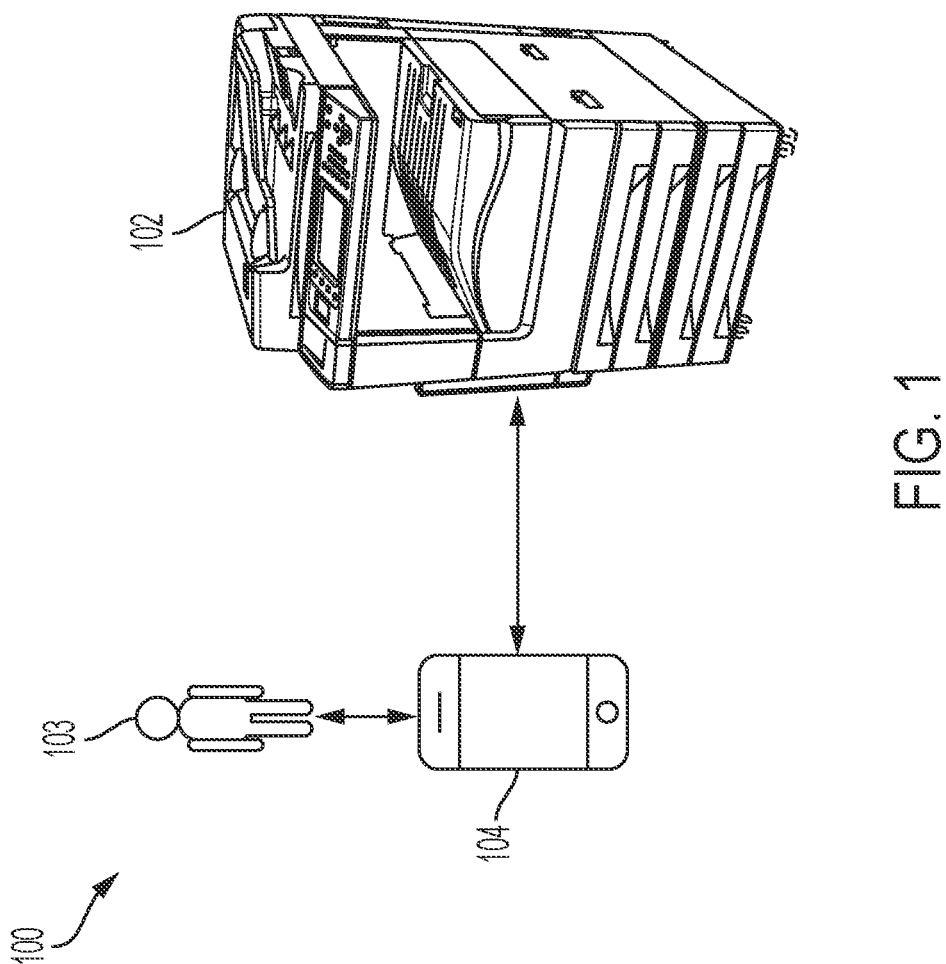
FIG. 1 shows an exemplary environment in which various embodiments of the disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples than just provided below.

The term "multi-function device" is a single device or a combination of multiple devices to perform one or more functions such as, but not limited to, printing, imaging, scanning, and so forth. The multi-function device may include software, hardware, firmware, or a combination thereof. In the context of the current disclosure, the multi-function device offers secure printing for documents such that the documents or content of the documents are not accessed/seen/stolen by any other users while the documents are getting printed at the multi-function device till completion and collection by a user. The secure printing is achieved by continuously tracking the user (who submits the document for printing) and a user registered device starting from when the document printing is initiated till completion of the document printing and collection by the user.

The "secure printing" refers to securing the document received for printing such that the document is secured from the start of the printing till the end of the printing and collection of the printed document by the user, thereby, avoiding unwanted peeking into the document or its content. For example, the document is secured such that no other users can view/steal/access the content of the document or the document, when the document is getting printed till completion and collection by the user.

The term "document" refers to any document including one or more pages. The document includes content in the form of text, images, graphics, or a combination thereof. The document can be in a virtual or software form (embodied in a software file). The virtual form can also be referred to as a digital form, an electronic version, or the like. The document can be any document sent to the multi-function device for printing. The document may be a confidential document or a document that the user wants to secure.

The term "user" refers to the one who wishes to print the document and submits the document for printing to the multi-function device. The user here is considered as an authorized user who can access/see/read or do anything with the printed document or the document. The printed document refers to the document in a physical form, such as printed on paper.

The term "user registered device" refers to any device of the user that is registered with the multi-function device for implementing the current disclosure. The user registered device is the one having one or more features based on which the multi-function device can track its presence near the multi-function device. Few non-limiting examples of the features of the user registered device may be Near-Field Communication (NFC), Global Positioning System (GPS), or the like. Various examples of the user device may be a mobile device, a Personal Digital Assistant (PDA), a laptop, or any portable device that can communicate with the multi-function device. The term "user registered device" may interchangeably be used with the phrase "user device" or "mobile device" and it is considered that the user device is registered with the multi-function device for implementing the current disclosure.

The term "detection" includes detecting the user and detecting the user registered device near the multi-function device. Here "detecting the user" refers to detecting the physical presence of the user (who submitted the document for printing) near the multi-function device. For example, a proximity sensor may be used detect the presence of the user. Similarly, "detecting the user registered device" refers to detecting the presence of the user's device (such as mobile phone) registered with the multi-function device, near the multi-function device. For example, a GPS sensor may be used to detect the presence of the user registered device near the multi-function device. In another example, NFC sensor may be used to detect the presence of the user registered device near the multi-function device. These are few exemplary ways of detecting the presence of the user and presence of the user registered device but other known or later developed ways can be used for detection.

The term "tracking" or "tracking user" includes tracking the user as well as the tracking the user registered device. And tracking further includes detecting the physical presence of the user and detecting the presence of the user registered device near the multi-function device. Based on the detection, printing is initiated and continued (if printing is already in progress). For example, when both—the user and the user registered device are detected near the multi-function device, printing is initiated or continued.

The term "near" refers to a few centimeters distance of the user and/or of the user registered device from the multi-function device. The "near" may vary based on the detection technique being implemented. For example, if the user is being tracked via the proximity sensor, then "near" may be 5 centimeter distance. In another example, if the user registered device is being tracked via the GPS sensor, then "near" may be 20 centimeters distance. In further example, if the user registered device is being tracked via the NFC sensor, then "near" may be 4 centimeters distance or closer to the multi-function device. These are few examples, the term "near" may be any distance of the user and/or of the user registered device from the multi-function device such that the user can keep monitoring the document while the document is getting printed at the multi-function device. The term "near" may interchangeably be used with the phrase "a pre-defined range" i.e., few centimeters distance of the user and/or the user registered device from the multi-function device.

The term "pause" refers to temporarily putting the document printing on hold when either the presence of the user or the presence of the user registered device is not detected near the multi-function device. The term "resume" refers to re-start printing the document from the page where it was last left, when both the user and the user registered device are detected again near the multi-function device.

The term "print completely" refers to printing all pages of the document according to print attributes/parameters as submitted by the user and collecting the printed document/pages by the user from an output tray or a collection area of the multi-function device.

The term "computing device" refers to a device that the user typically uses for giving print commands and other purposes. Examples of the computing device include, but are not limited to, a personal computer, a desktop, a laptop, a mobile phone, a tablet, a Personal Digital Assistant (PDA), a smart-phone or any other device capable of data communication. The computing device includes a print driver application that allows the user to submit print commands, one or more print parameters and a document for printing. In context of the present disclosure, the print driver application includes an option that allows the user to mark/tag whether the document requires secure printing. For example, the option may be "set as confidential document".

Overview

The present disclosure provides methods and systems offering secure printing while printing documents at a multi-function device. The methods and systems propose a new security feature for printing documents, for example, confidential documents such that the documents are secured from the start of printing the document till the end of printing the document as well as collection of the printed document by a user. The methods and systems provide an option to the user to tag the document either as a confidential document or the document for secure printing. Once tagged, tracking feature is activated such that end-to-end tracking of the user (i.e., the physical presence of the user and his registered device near a multi-function device) is performed, starting from when printing the document is initiated till printing the document is completed and further the printed document is collected by the user. The end-to-end tracking ensures that the document submitted for secure printing is not printed when the user (i.e., the user himself or his registered device) is physically not present near the multi-function device, even if the user releases the document from the multi-function device. The methods and systems may track the user using two or more methods while the document is printing. For example, the user may be tracked using proximity sensing techniques. In another example, the user may be tracked using GPS or NFC sensing techniques. The methods and systems further alert the user to stay near the multi-function device when either the user or the user registered device is not present/detected near the multi-function device. The tracking ends after the document is completely printed and collected by the user. This way, the disclosure provides secure printing of the document from the start of printing the document till the end of the printing and collection by the user.

Here, the disclosure proposes a 2-way (user and the user registered) and 2-type (proximity and GPS/NFC) monitoring of confidential documents such that the confidential documents are not printed at the multi-function device till the user's presence is detected near the multi-function device, even if the user releases the document for printing. The 2-way and 2-type of monitoring adds an additional security layer that ensures the user is present near the multi-function device such that the user can keep monitoring his document and content printed out is not being stolen/seen/read/accessed by other users (who are not authorized), who may be present near the multi-function device.

Exemplary Environment

FIG. 1 shows an exemplary environment 100 in which various embodiments of the disclosure can be practiced. The environment 100 includes a multi-function device 102 and a user device 104 communicatively coupled to the multi-function device 102. Various examples of the multi-function device 102 may be a printer, a multi-function peripheral device, or the like. Examples of the user device 104 may be a mobile device, a smart phone, a Personal Digital Assistant (PDA), or any portable device with at least features such as Global Positioning System (GPS), Near Field Communication (NFC) and so on. The user device 104 is a device registered with the multi-function device 102 for securing documents. The multi-function device 102 can communicate with the user device 104 using GPS, NFC, or a combination thereof. The multi-function device 102 may be coupled to the user device 104 through a communication network (although not shown). The communication network may be a wireless network, a wired network, or a combination thereof. The communication network may be implemented as one of the different types of networks, such as intranet, Local Area Network (LAN), Wide Area Network (WAN), the Internet, and the like. The communication network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the communication network may include a variety of network devices, including routers, bridges, servers, computing devices, storage devices, and the like. The multi-function device 102 and the user device 104 collectively forms a system.

The multi-function device 102 provides one or more functionalities such as printing, scanning, imaging, copying, or the like. In context of the present disclosure, the multi-function device 102 offers secure printing with tracking feature. The tracking feature can be enabled or disabled for any users based on the requirement.

A user 103 uses the user device 104 for his day-to-day tasks such emails, chat, calls, surfing, messages, etc. The user 103 submits a document for printing to the multi-function device 102. The document for printing can be submitted via a computing device (for example via a print driver of the computing device). Alternatively, the document for printing can be submitted via the user device 104. The document for printing can be submitted via Internet services such as CentreWare Internet Services (CWIS). The document for printing can be submitted via a memory of the multi-function device 102. The document for printing can be submitted via external storage device such as USB, hard disk, etc. These are few examples, but any other print submission tools can be used for submitting the document for printing without deviating from the scope of the disclosure.

The document includes one or more pages having content in the form of text, image, graphics, or a combination thereof. Various formats of the document may include, but are not limited to, Portable Document Format (PDF), Microsoft DOC format, Hypertext Markup Language (HTML) format, Extensible Markup Language (XML) format, Microsoft XLS format, and Tag Image File Format (TIFF) without limiting the scope of disclosure.

The multi-function device 102 receives the document for printing and prints the document according one or more print attributes as received from the user 103. In context of the present disclosure, the multi-function device 102 offers secure printing with tracking feature such that the document received for printing or content of the document is not accessed/seen/stolen/read by any other user. The multi-function device 102 prints only when the presence of the user 103 as well as the presence of the user registered device 104 is detected near the multi-function device 102. For example, the multi-function device 102 initiates printing the document and continues printing the document when the both the user 103 and his device 104 are found present near the multi-function device 102. To this end, the multi-function device 102 starts tracking the user 103 (i.e., the user 103 and his device 104) when printing the document is initiated and continues tracking the user 103 till the document is completed printed and collected by the user 103. The multi-function device 102 tracks the user 103 using two or more methods such as proximity sensing, GPS sensing or NFC sensing methods or the like. The proximity sensing method detects the physical presence of the user 103 near the multi-function device 102, while the GPS/NFC sensing method detects the presence of the user registered device 104 near the multi-function device 102. The proximity sensing ensures the presence of the user 103 near the multi-function device 102 and the GPS/NFC sensing further ensures that the user detected near the multi-function device 102 is the actual/authorized user i.e., the user 103 who submitted the document for printing, by detecting the presence of the user registered device 104 near the multi-function device 102. Once the printed document is collected by the user 103, the multi-function device 102 automatically stops tracking the user 103 and his device 104. Alternatively, the user 103 can manually press a button or can select an option provided on the multi-function device 102 to stop tracking. This way, the document or content of the document can be kept confidential always until the user 103 have the printed document in his hand and further ensures only the intended users such as the user 103 sees printouts at the multi-function device 102.

Before the multi-function device 102 begins tracking, the user 103 requires registering with the multi-function device 102 for secure printing. The registration is a one-time process. Initially, the user 103 sends a request to enable tracking of his confidential documents. The user 103 can raise the request directly at the multi-function device 102 or can directly request to an administrator. Upon receiving the request from the user 103, the administrator enables the tracking feature in Internet Services such as CentreWare Internet Services (CWIS) for the user 103. The administrator can enable the tracking feature for all users who wish to track their confidential documents. Once the feature is enabled by the administrator, the user 103 further requires completing the registration at the multi-function device 102. When the user 103 logs in into the multi-function device 102 next time, i.e., after the feature is enabled by the administrator, the multi-function device 102 requests the user for his GPS/NFC details. Once logged in, the multi-function device 102 requests the user to enable features such as GPS or NFC in his device 104. Once enabled, the multi-function device 102 automatically receives GPS and NFC details of the user device 104 and finally registers the user device 104 with the multi-function device 102. For example, in case of GPS, the multi-function device 102 uses the IMEI (The International Mobile Equipment Identity) number and location service which is turned on the user device 104 to communicate with the multi-function device 102. In case of NFC, the multi-function device 102 uses TAP to pair technology where a network interface is obtained to establish a TCP/IP (Transmission Control Protocol/Internet Protocol) connection between the user device 104 and the multi-function device 102. These are exemplary ways but the multi-function device 102 and the user registered device 104 can communicate using any known methods or later developed methods. Once the user 103 completes the registration process, the user device 104 is considered as a registered device. After successful registration, the multi-function device 102 activates the tracking feature when the user 103 submits any document that requires secure printing or a confidential printing.

Figure 3A:
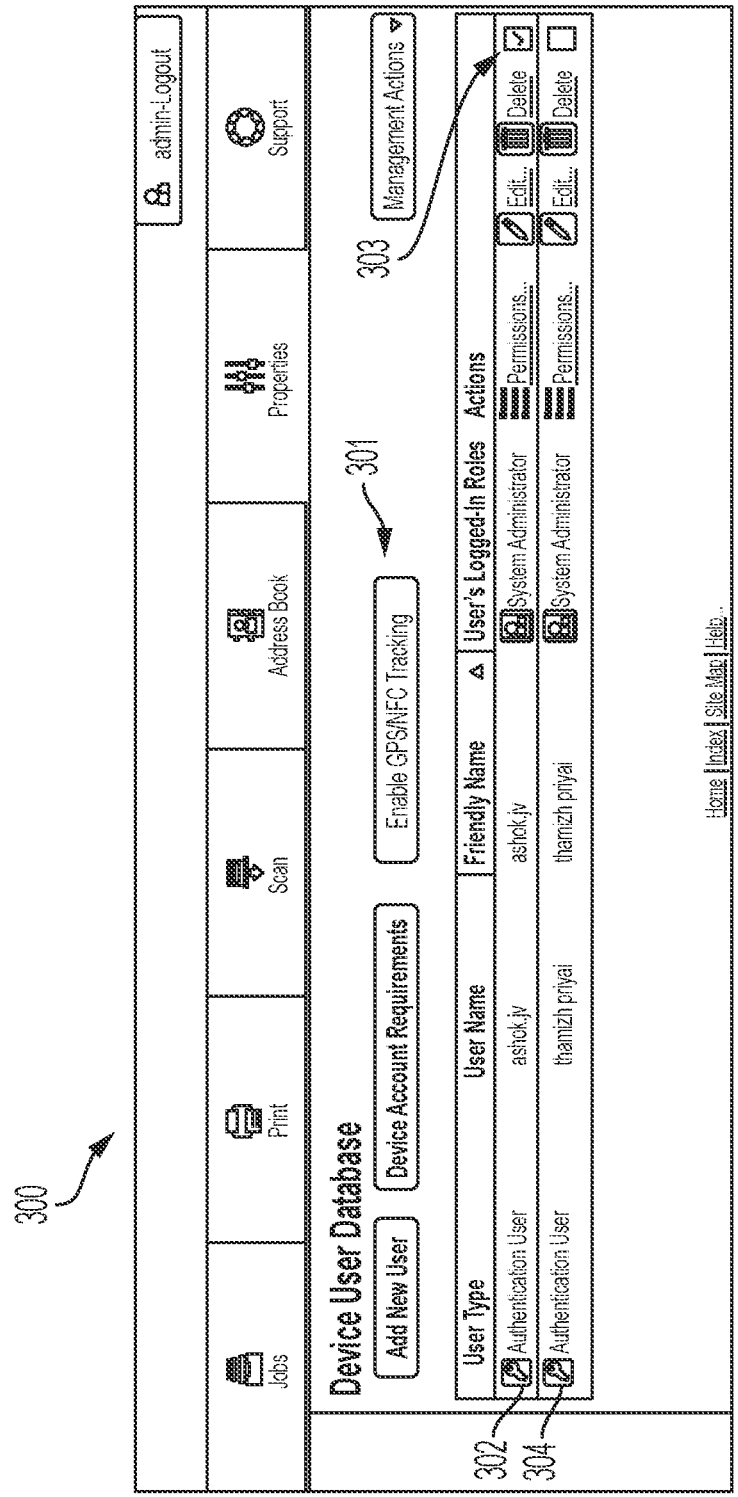
FIGS. 3A and 3B show exemplary snapshots for registering secure printing services, in accordance with an embodiment of the present disclosure.
Figure 3B:
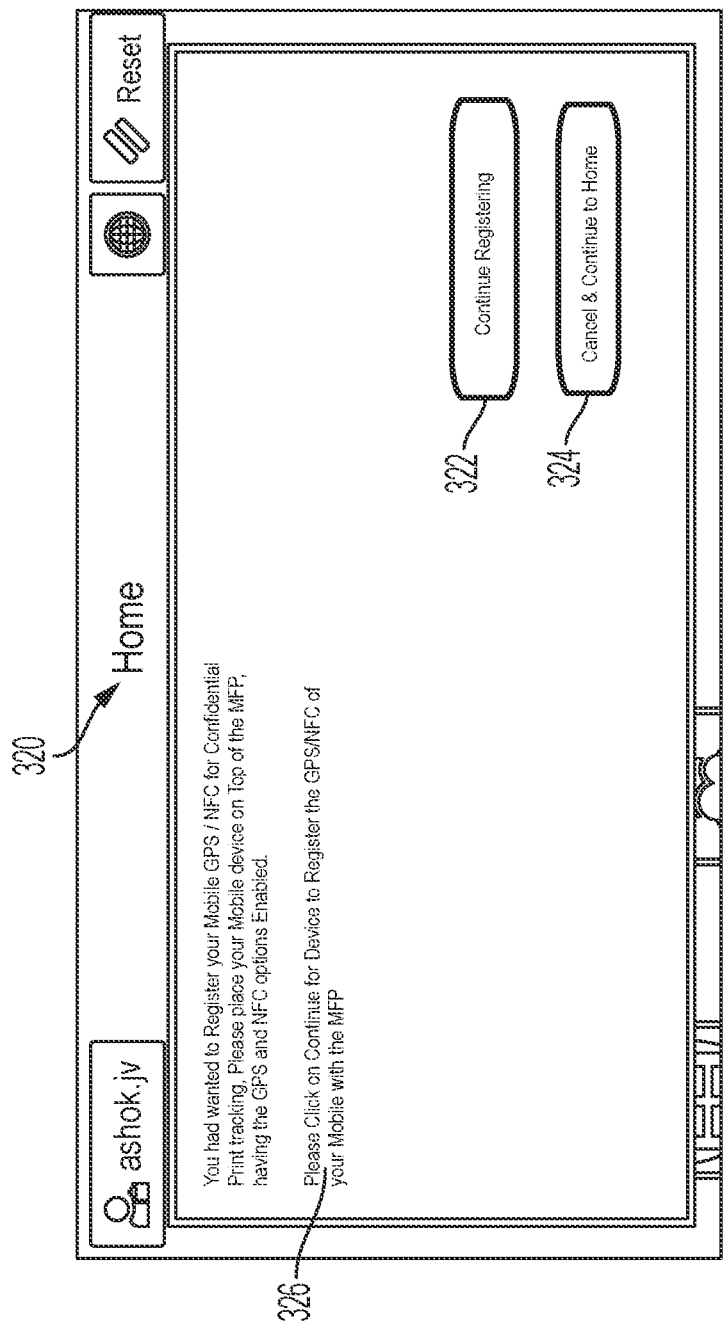

As shown in the snapshot 300 of FIG. 3A, the multi-function device 102 includes a tracking feature (marked as 301). The tracking feature 301 can be enabled for any user. For example, the administrator can select any listed users such as 302 and 304 and enable the tracking feature 301 by selecting a checkbox such as 303. As shown in the snapshot 300, the tracking feature is enabled for the user 302. When the user 302 logs in into the multi-function device 102, a pre-defined message such as 326 is shown to the user 302 as shown in the snapshot 320 of FIG. 3B. The pre-defined message 326 includes instructions for the user 302 on how to complete the registration at the multi-function device 102. The user 302 completes the registration by selecting an option 322 such as continue registration. When the user 302 selects the option 322, the GPS/NFC details of the user registered device 104 are automatically obtained by the multi-function device 102 and registered with the multi-function device 102. Otherwise, the user 302 can select an option 324 and can cancel the registration. This way, the registration for secure printing is completed by the user 302.

Exemplary System

Figure 2:
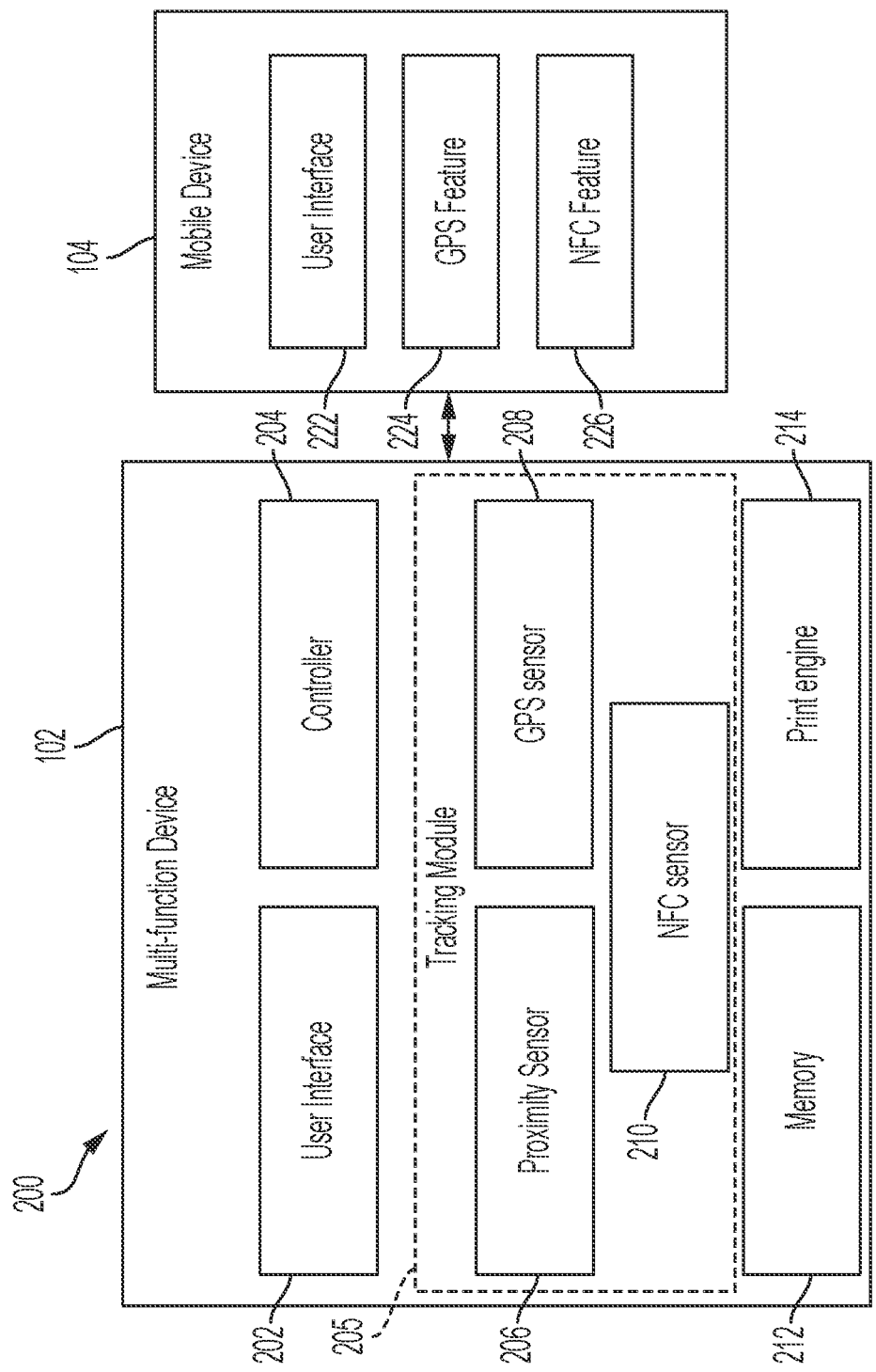
FIG. 2 shows a system implementing the present disclosure.

FIG. 2 is a block diagram illustrating various components of a system 200 including a multi-function device 102 communicatively coupled to a user registered device 104. The multi-function device 102 includes a user interface 202, a controller 204, a tracking module 205 including a proximity sensor 206 (can be referred to as a first sensor), a GPS sensor 208, an NFC sensor 210 (collectively can be referred to as one or more second sensors), a memory 212 and a print engine 214. The user registered device 104 includes a user interface 222, a GPS feature 224, an NFC feature 226. The user registered device 104 includes a memory (although not shown in FIG. 2). The system 200 may additionally include a computing device (although not shown) having a print driver. Each of the components 202-214 of the multi-function device 102 is connected to each other via a conventional bus or a later developed protocol. Similarly, each of the components 222-226 of the mobile device 104 is connected to each other via a conventional bus or later developed protocols. Further, each of the components 202-214 and 222-226 communicates with each other for implementing the present disclosure.

A user typically uses the computing device for his daily tasks such as emails, surfing, work, chatting, prints etc. Examples of the computing device include, but are not limited to, a personal computer, a laptop, a mobile phone, a tablet, a Personal Digital Assistant (PDA), a smart-phone or any other device capable of data communication. The computing device may be communicatively coupled to the multi-function device 102 through a communication network as discussed above or later developed network.

The computing device runs several applications and software for functioning of the computing device. One such example is a print driver. The print driver allows the user to give print commands and submit a document for printing. The print driver includes one or more print parameters for printing the document. The one or more print parameters may be print all pages, print specific pages based on page number selection, print current page, double-sided print, single-sided print, job type, quality, destination and so on. In context of the present disclosure, the print driver includes a new option of tagging/marking the document as a confidential document. Tagging the document as a confidential document helps the multi-function device 102 recognize to secure that document at the time of printing at the multi-function device 102. The new option may be such as "set as confidential". The new option can be selected when the user wishes to secure a particular document. The option can be selected for any document that is confidential or otherwise whose content needs to be secured or protected while printing. Upon successful selection of the print parameters and the new option by the user, the print driver then sends the document, the print parameters, and the selection of the new option for printing to the multi-function device 102.

Figure 4A:
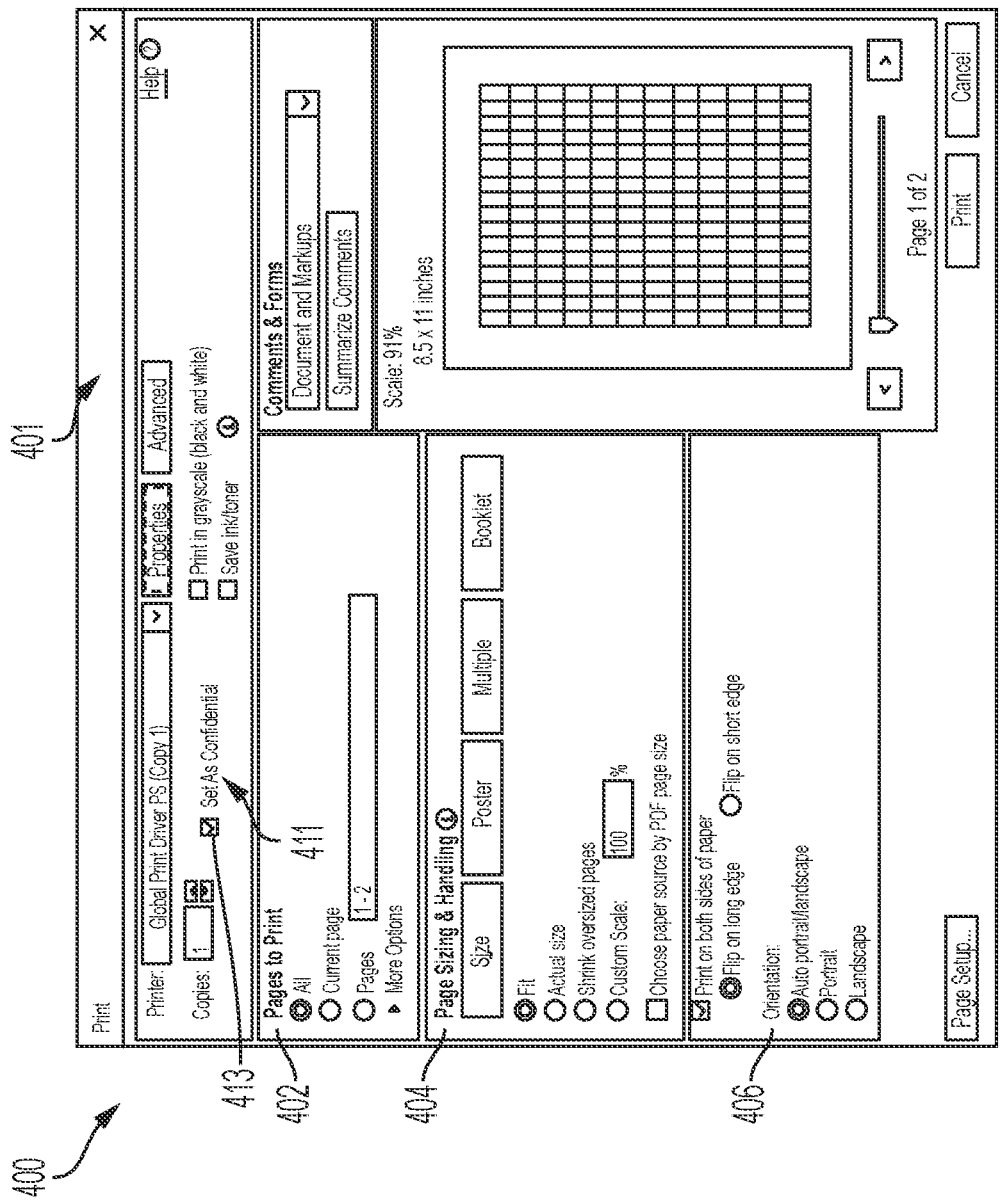
FIGS. 4A and 4B show exemplary snapshots of a print driver including an option for secure printing.
Figure 4B:
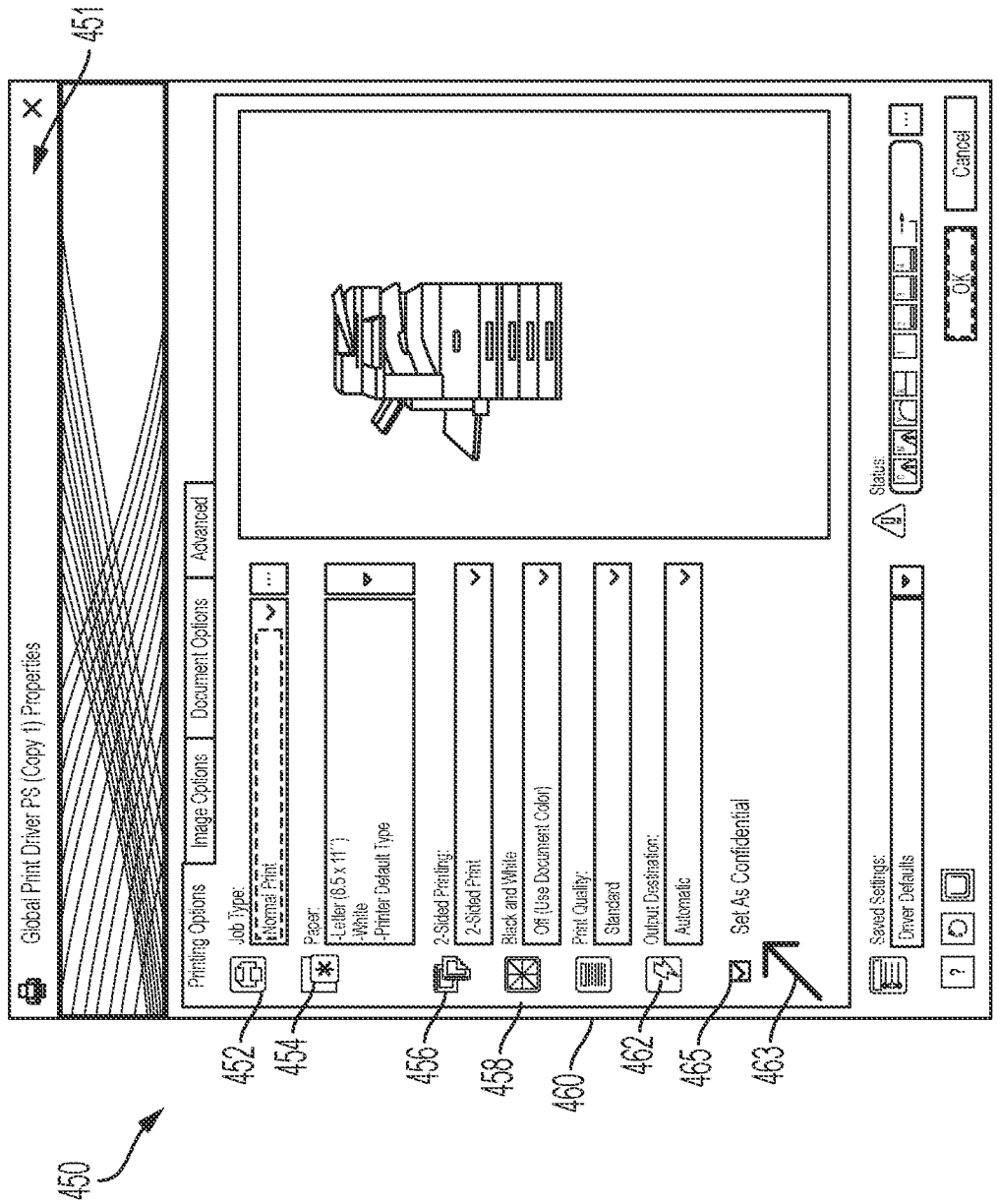

One exemplary snapshot 400 of the print driver 401 is shown in FIG. 4A. The print driver 401 includes one or more print parameters such as 402, 404, and 406, for printing the document. The print parameters 402, 404 and 406 can be selected by the user. In context of the present disclosure, the print driver 401 includes a new option 411 such as "set as confidential". The new option 411 can be selected by the user via a checkbox such as 413. If the user wishes to secure a document while the document is printing at the multi-function device 102, the user can select the checkbox 413. Once selected, the print driver 401 may tag the document as a confidential document or a document to be secured while printing and send the tagged document to the multi-function device 102 for further processing. Another exemplary snapshot 450 of a print driver 451 is shown in FIG. 4B. The print driver 451 includes regular options or print parameters such as job type 452, paper 454, 2-sided printing 456, black & white 458, print quality 460, output destination 462 and so on. The user can select any of the parameters 452, 454, 456, 458 460 and 462 based on his requirement/choice. In context of the disclosure, the print driver 451 includes a new option 463 as "Set as confidential". The selection of the option 463 automatically tags the document as confidential. The option 463 can be selected via a checkbox 465.

The multi-function device 102 receives the document, the print parameters, and the selection of the new option such as 463 or 411 from the print driver. The multi-function device 102 stores all details received from the print driver in the memory 212 of the multi-function device 102 for further processing. Specifically, the controller 204 receives the document, the print attributes, and the selection of the new option from the print driver. The controller 204 then identifies whether the document requires secure printing based on the selection of the new option or tagging of the document. For example, if the controller 204 identifies tagging in the document, the controller 204 considers the document for secure printing. If the controller 204 identifies that the user has selected the new option i.e., set as confidential option, the controller 204 considers the document for secure printing. In case the controller 204 identifies there is no marking/tagging or selection of the new option, the controller 204 proceeds with printing using any conventional method or approach. Upon identification, the controller 204 activates the security feature by activating the tracking module 205. Specifically, the controller 204 activates the tracking module 205, where the proximity sensor 206, the GPS sensor 208 and NFC sensor 210 are activated at the multi-function device 102.

To initiate printing at the multi-function device 102 or releasing the document at the multi-function device 102, the user requires to provide his credentials at the multi-function device 102. Various examples of the credentials may be username, password, passcode, employee id, employee code or a combination thereof. The user inputs his credentials via the user interface 202 to release the document. Based on the received credentials, the controller 204 authenticates the user. If the user credentials as input matches with the credentials stored in the memory 212, the controller 204 considers the authentication as successful and further allows the user to release the print job. Else, the user is not allowed to release the document. The tracking module 205 initiates tracking of the user and the user registered device 104 to detect whether the user and the user registered device 104 are present near the multi-function device 102. The tracking module 205 tracks the user via the proximity sensor 206 whereas the tracking module 205 tracks the user registered device 104 via at least one of: the GPS sensor 208 or the NFC sensor 210. When both the user and the user registered device 104 are found present near the multi-function device 102, the tracking module 205 communicates the same to the controller 204. The controller 204 further communicates with the print engine 214 and directs the print engine 214 to initiate printing. Here, the print engine 214 starts printing the document. But if either—the user or the user registered device 104 is not present near the multi-function device 102, the controller 204 communicates with the print engine 214 and further directs the print engine 214 to not initiate printing the document even if the user has released the document at the multi-function device 102 by inputting his credentials. As a result, printing of the document is not started. The printing is initiated only when both the user and the user registered device 104 are present near the multi-function device 102. This way, printing of the document is initiated.

This way, the tracking module 205 initiates tracking the user and the user registered device 104 and continues tracking till the document is printed completely and collected by the user. The tracking module 205 continuously communicates with the controller 204 and updates the controller 204. Based on the communication from the tracking module 205, the controller 204 further directs the print engine 214 to print or not print the document. In some implementations, the controller 204 can directly interact with the proximity sensor 206, GPS sensor 208, or NFC sensor 210 without limiting the scope of the disclosure.

While initiating printing the document, the controller 204 generates an initial alert for the user and displays the alert to the user via the user interface 202 of the multi-function device 102. The alert may be in the form of a message for the user to stay near the multi-function device 102 till document is printed completely. The alert may further indicate the user to carry his registered device 104 near the multi-function device 102.

In detail, the proximity sensor 206 detects the presence of the user near the multi-function device 102. If the user is detected in front of the multi-function device 102, then the physical presence of the user is considered near the multi-function device 102. The GPS sensor 208 detects the presence of the user registered device 104 near the multi-function device 102. The presence of the user registered device 104 is detected by detecting the strength of GPS signals of the user registered device 104. If the strength of the GPS signals is strong, the user registered device 104 is considered near the multi-function device 102. If the strength of the GPS signals is weak, then the user registered device 104 is not considered near the multi-function device 102. If the GPS signal detected from the user registered device 104 is very strong, the GPS sensor 208 communicates the same to the controller 204 in real-time. The proximity sensor 206 continuously detects the physical presence of the user and the GPS sensor 208 continuously detects the presence of the user registered device 104 near the multi-function device 102 till the document is printed completely and collected by the user.

The proximity sensor 206 and GPS sensor 208 continuously detects the presence of the user and the user registered device 104 respectively and communicates the same to the controller 204 in real-time. If the presence of the user is detected near the multi-function device 102 and the presence of the user registered device 104 is detected near the multi-function device 102, then the controller 204 directs the print engine 214 to continue printing the document. For example, if the proximity sensor 206 detects the user presence within a pre-defined range such as 0-350 mm to 0-600 mm (0-13.78 in. to 0-23.6 in.) and the GPS sensor 208 detects the strength of the GPS signals as strong, then the print engine 214 continues printing the document. In other words, if the proximity sensor 206 and the GPS sensor 208 detects the user and user registered device 104 near the multi-function device 102, then a pre-defined condition is met. In such cases, the controller 204 considers both the user and the user registered device 104 are present near the multi-function device 102 and directs the print engine 214 to continue printing of the document.

In one example, the proximity sensor 206 may be a smart proximity sensor that detects when the user approaches or leaves the device such as 102, using a reflective sensor. This feature provides convenience for users and can reduce power consumption. The device may be configured to wake up and sleep based on the detection of the user.

If either of the proximity sensor 206 or the GPS sensor 208 detects or finds that the user or the user registered device 104 respectively are not present near the multi-function device 102, the proximity sensor 206 and the GPS sensor 208 communicates the same to the controller 204. The controller 204 considers that the pre-defined condition is not met. Subsequently, the controller 204 further interacts with the print engine 214 and directs the print engine 214 to pause printing of the document till both the physical presence of the user and the presence of the user registered device 104 is detected again near the multi-function device 102. For example, if the proximity sensor 206 finds that the physical presence of the user is not within the pre-defined range of the multi-function device 102 or not near the multi-function device 102 but the GPS sensor 208 detects the user registered device 104 is present near the multi-function device 102, the controller 204 directs the print engine 214 to pause printing the document till the user's presence is also detected again within the pre-defined range i.e., near the multi-function device 102. In another example, if the GPS sensor 208 finds that the strength of GPS signal is weak or fails to find GPS signals of the user registered device 104 but the proximity sensor 206 detects the physical presence of the user within the pre-defined range of the multi-function device 102, then the controller 204 pauses printing the document till the GPS signals of the user registered device 104 are detected again. If both the proximity sensor 206 and the GPS sensor 208 detects/finds the user and the user registered device 104 are not present near the multi-function device 102 respectively, the controller 204 pauses printing the document till both the user's physical presence and the user registered device 104 are detected again near the multi-function device 102.

In all such scenarios, an alert is generated for the user. The alert message may be a message for the user to stay near to the multi-function device 102 or to stay within the pre-defined range/near of the multi-function device 102. The alert message may be a text message, for example, displayed on the user registered device 104. Alternatively, the alert message may be an audio message such as beep sound.

The proximity sensor 206 continues to detect the user's physical presence and the GPS sensor 208 continues to detect the presence of the user registered device 104 by detecting or measuring the strength of the GPS signals of the user registered device 104. When both—the user's presence and the GPS signals of the user registered device 104 are detected again near the multi-function device 102, the proximity sensor 206 and the GPS sensor 208 communicates the same to the controller 204. The controller 204 directs the print engine 214 to resume printing the document. The print engine 214 resumes printing the document from where it was left last. For example, if 3 pages of a document having 7 pages are printed by the print engine 214, then the print engine 214 resumes printing from printing page 4 of the document. The tracking module 205 continues tracking the user and the user registered device 104 using two or more methods such as GPS sensing and proximity sensing methods till the document is printed completely and collected by the user. The proximity sensor 206 and the GPS sensor 208 continues to track the user and user registered device 104 till the document is printed completely and collected by the user.

If GPS signals are not received for any reason, for example, GPS signals of the user registered device 104 are weak or not in range or otherwise not detected by the GPS sensor 208, the controller 204 provides an alternate option to the user to enable NFC feature 226 on his registered device 104. If the user wishes, the user can enable the NFC feature 226 and this allows the tracking module 205 to track the user registered device 104 using the NFC feature 226. The user can opt for NFC to be tracked by enabling the NFC feature 226 in his registered device 104. In such cases, the user requires to put his device 104 close to the NFC sensor 210 of the multi-function device 102. The NFC sensor 210 reads NFC details of the user registered device 104, if the NFC details matches with the details stored at the time of registration, the user registered device 104 is considered an authorized device and is near the multi-function device 102. The NFC sensor 210 ensures that the presence the user's registered device 104 is detected using NFC feature 226 and communicates the same to the controller 204. Based on the detection of the presence of the user registered device 104, the controller 204 directs the print engine 214 to continue printing the document. But if the NFC sensor 210 fails to detect the presence of the user registered device 104 near with the multi-function device 102, the NFC sensor 210 communicates the same to the controller 204. The controller 204 then directs the print engine 214 to pause printing the document. The document printing is resumed when the NFC sensor 210 detects the user registered device 104 again near the multi-function device 102.

In case the user does not enable the NFC feature 226 in his device 104, the GPS sensor 208 continues to find GPS signals of the user registered device 104 and the controller 204 directs the print engine 214 to continue printing the document till the document is printed completely.

Once the document is printed completed and collected by the user from a collection area or an output tray, the controller 204 automatically stops tracking the user and the user registered device 104. Alternatively, the user can manually stop the tracking, for example, by pressing a button on the multi-function device 102 or otherwise through an option included in the user interface 202 to stop tracking.

The memory 212 stores the document received for printing, the print parameters and the selection of the new option as received from the user or the computing device of the user. The memory 212 further stores user credentials, NFC details, GPS details and other details of the user and the user registered device 104 required for implementing the current disclosure. The controller 204 retrieves the required details from the memory 212 for implementing the present disclosure.

The user interface 202 displays various messages to the user, for example, the message may relate to status of the document, display progress of the document, status of the tracking the user and the user registered device 104 and so on. The user interface 202 also allows the user to select any displayed options and take the required action. For example, the user can select an option to end tracking. Upon selection of the option by the user, the controller 204 stops tracking the user and the user registered device 104.

The user interface 222 of the user registered device 104 displays various messages or alert to the user. For example, the message may be in the form of a text message to stay near the multi-function device 102 when the user moves away from the multi-function device 102 or moves out of a defined range of the multi-function device 102. The user interface 222 further allows the user to do any selection, for example, turn-on or turn-off GPS feature 224, NFC feature 226 and so on. The GPS feature 224 of the user registered device 104 provides location information of the user registered device 104. The GPS feature 224 may be in the form of GPS chip in the user registered device 104 or otherwise functionality is incorporated in the user registered device 104. The NFC feature 226 in the user registered device 104 is available in the form of an NFC chip or otherwise in the device 104. The NFC feature 226 of the user registered device 104 is activated when in close proximity of the multi-function device 102.

Although the disclosure is discussed where the document is submitted through the computing device, where the computing device is different from the user registered device 104. In such implementations, the user registered device 104 is tracked. But the document for printing may be submitted through the user registered device 104. In such cases, the option 411 or 463 can be included in the user interface 222 of the user registered device 104. Here, the device using which the document is submitted and the device which is tracked for secure printing are the same i.e, the user registered device 104. Any user device registered with the multi-function device 102 can be tracked. These are just exemplary implementations but other variations may be implemented.

Exemplary Flowcharts

Figure 6:
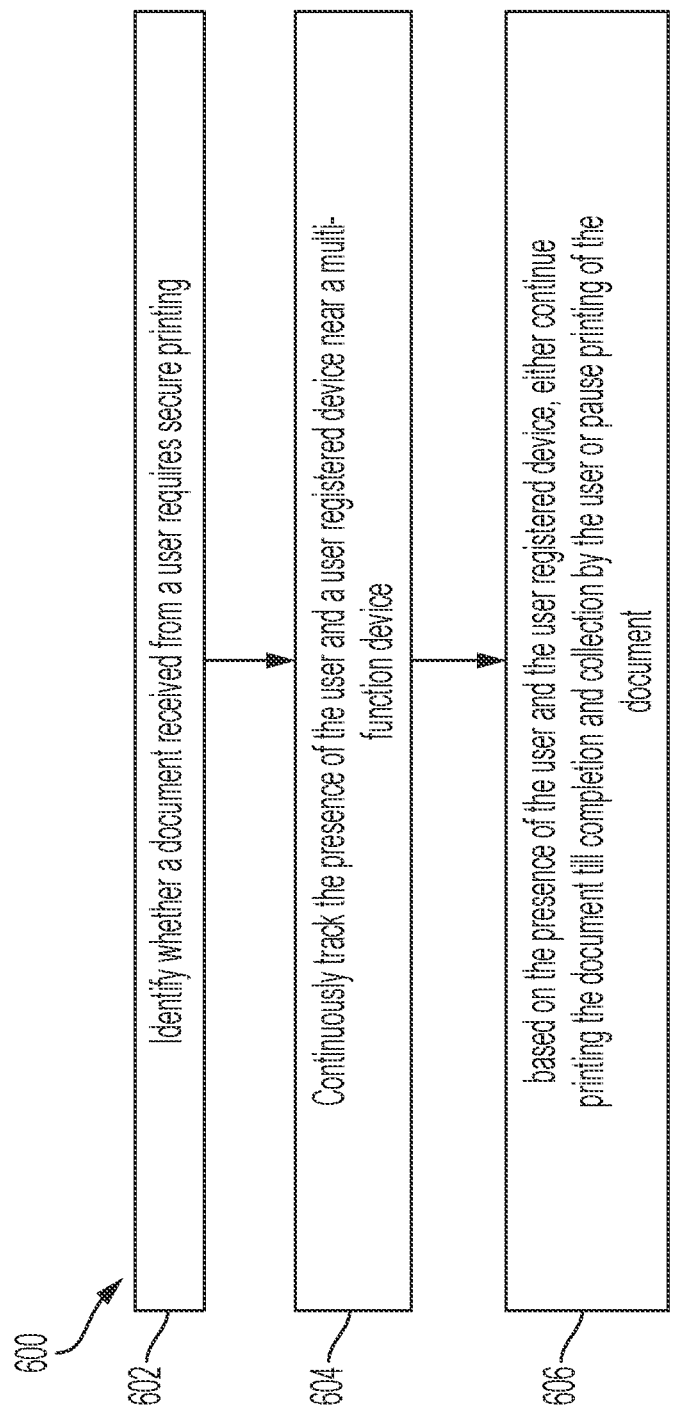
FIG. 6 is a method flowchart for secure printing at a multi-function device.

FIG. 6 is a method flowchart 600 for secure printing of documents for example confidential documents while the documents are getting printed at a multi-function device such as 102 or at a printer. One exemplary approach of secure printing is by end-to-end tracking of a user and a user registered device from the start of printing the document till the end of printing the document and collection of the printed document by the user. The end-to-end tracking ensures that the user is near the multi-function device throughout the printing of his document such that the document/content of the document/any page of the document is not accessed/stolen/read/seen by any user other than the user of the document who submitted it for printing. The method 600 can be implemented at a multi-function device, a printer, a multi-function peripheral device, or any device with security features and printing capabilities. The method 600 can be implemented for any document of the user that the user wishes to secure or otherwise is a confidential document.

Initially, the user submits a document and one or more print parameters for printing via a print driver or other ways. At the time of submitting the document for printing, the user marks/selects the document as a confidential document. The marking can be done by selection of a newly introduced option such as "set as confidential" in the print driver or other print submission tools. Alternatively, the user can use confidential watermark in the document. The print driver receives the document, the print parameters and the marking selection and sends these to a multi-function device for printing. The document may include one or more pages having content in the form of an image, text, graphics, or a combination thereof. The document can be in any format such as PDF, MS doc, MS ppt, etc.

The document is received at the multi-function device. Along with the document, the print parameters and selection of the new option is received. The details received from the print driver are stored for further processing. Upon receiving, it is identified whether the document requires secure printing at 602. For example, if the selection includes selection of a confidential document, then it is identified that the document requires secure printing and subsequently, tracking feature is activated to provide secure printing for the document of the user. Else, the method 600 proceeds with conventional ways.

To initiate printing of the document at the multi-function device, the user inputs his details such as username, password at the multi-function device. Based on his correct credentials, the document is released at the multi-function device. Then, tracking of the user and tracking of the user registered device is initiated. Tracking includes detecting the presence of the user near the multi-function device and detecting the presence of the user registered device near the multi-function device. For example, the user's presence can be detected using proximity sensors. The presence of the user registered device can be detected via GPS sensors by detecting the strength of GPS signals. In another example, the presence of the user registered device can be detected via NFC sensor.

If both—the presence of the user and the user registered device is detected near the multi-function device, printing of the document is initiated. But if either—the user or the user registered device is not present near the multi-function device, then printing of document is not initiated or begun. So, printing of the document is initiated only when both the physical presence of the user and the presence of the user registered device is detected near the multi-function device. Otherwise, printing is not initiated.

At 604, tracking of the user and the user registered device is continued till the document is printed completely and collected by the user.

At 606, based on the presence of the user and the user registered device, one of the following is performed—either printing the document is continued till completion and collection by the user or printing the document is paused.

If both—the presence of the user and the presence of the user registered device is detected near the multi-function device, then printing the document is continued. Otherwise printing the document is paused. The presence of the user and the presence of the user registered device is continuously monitored till the document is printed and collected by the user.

If either—the presence of the user or the presence of the user registered device is not detected near the multi-function device, then printing the document is paused. For example, if the user's presence is not detected near the multi-function device due to some reasons but the presence of the user registered device is detected near the multi-function device, then printing the document is paused. In another example, if the presence of the user registered device is not detected near the multi-function device but the presence of the user is detected near the multi-function device, then also printing of the document is paused. Here, the document printing is temporarily put on hold till both the user and the user registered device are found to be present again near the multi-function device. In such cases, an alert is generated for the user and sent to the user registered device. The alert may include a message to stay near to the multi-function device till the document is printed completely and collection by the user.

In some implementations, an option is provided to the user to track the user registered device using an alternative method such as NFC method. For example, if the presence of the user is detected near the multi-function device but the presence of the user registered device is not detected near the multi-function device due to various reasons such as GPS signals are not found or weak, then an alternate option is provided to the user to detect the user registered device, for example, via NFC. Once the user selects the option to switch to the alternate option, then the user is required to activate NFC on his registered device. Upon successful NFC activation, the user requires to put his registered device in close proximity with the multi-function device such that NFC chip of the user device is close to NFC sensor of the multi-function device. This way, the presence of the user registered device is detected near the multi-function device. Subsequently, printing of the document is resumed. The presence of the user registered device is continuously monitored via NFC sensing method till the document is printed and collected by the user.

In case the user does not wish to switch to the alternate option such as NFC, then the presence of the user registered device is detected via GPS.

In cases, where the presence of the user registered device is not detected near the multi-function device using NFC, then the method 600 automatically switches to GPS method. Here, the method 600 starts tracking the user registered device using GPS signals.

The blocks of detecting the presence of the user and detecting the presence of the user registered device are repeated till the document is completely printed at the multi-function device and collected by the user. In cases, where the presence of the user registered device is not detected using a method, the method 600 automatically switches to an alternative method. For example, if the presence of the user registered device is detected using NFC sensing method, then the method 600 may switch to an alternative method such as GPS sensing. In another example, if the presence of the user registered device is detected using GPS method, then the method 600 may switch to an alternative method such as NFC method. Otherwise, the method 600 continues to detect the presence of the user registered device using the primary method i.e., GPS, for example.

Upon completion of printing, tracking the user and user registered device is automatically stopped. Alternatively, the user can manually stop the tracking.

Figure 5A:
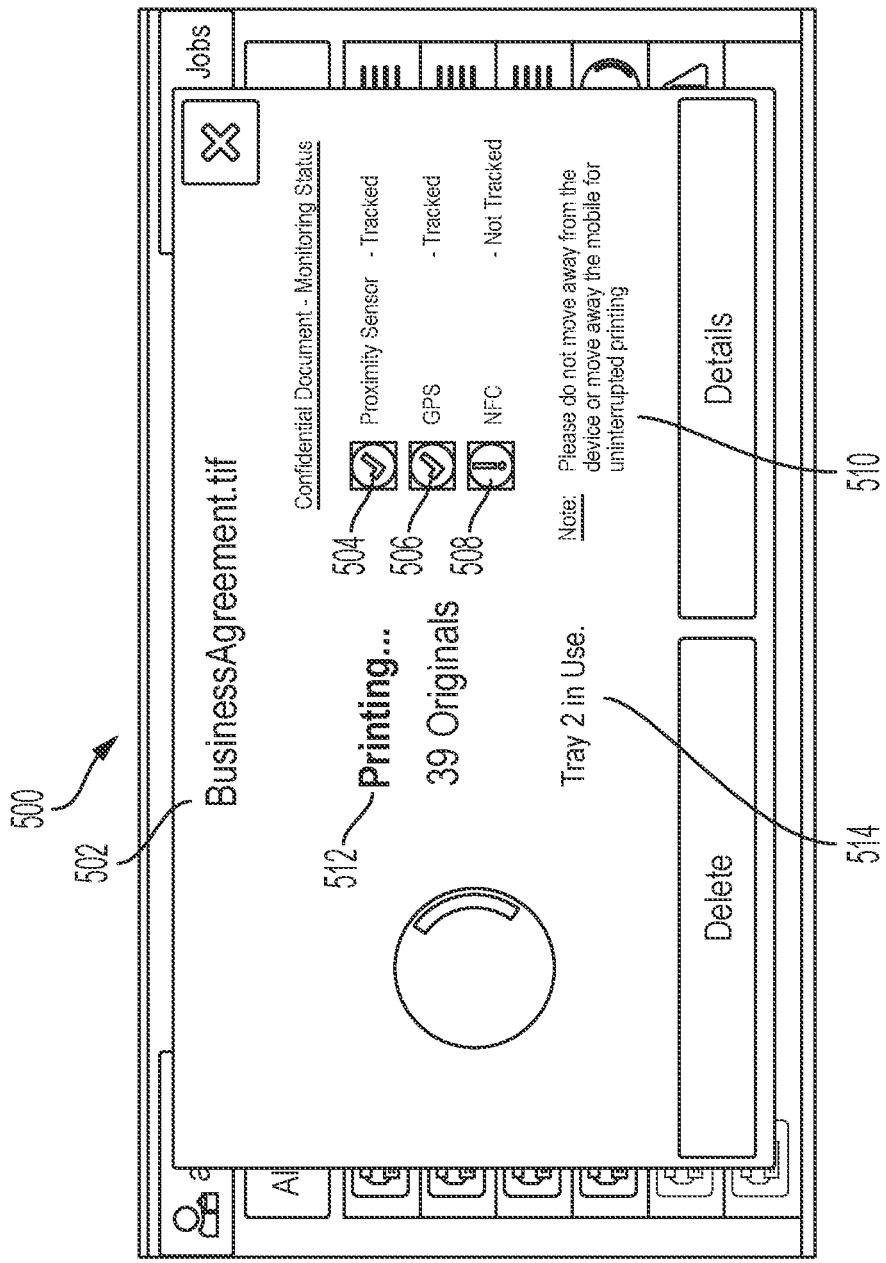
FIGS. 5A-5C show exemplary snapshots of printing at a multi-function device.
Figure 5B:
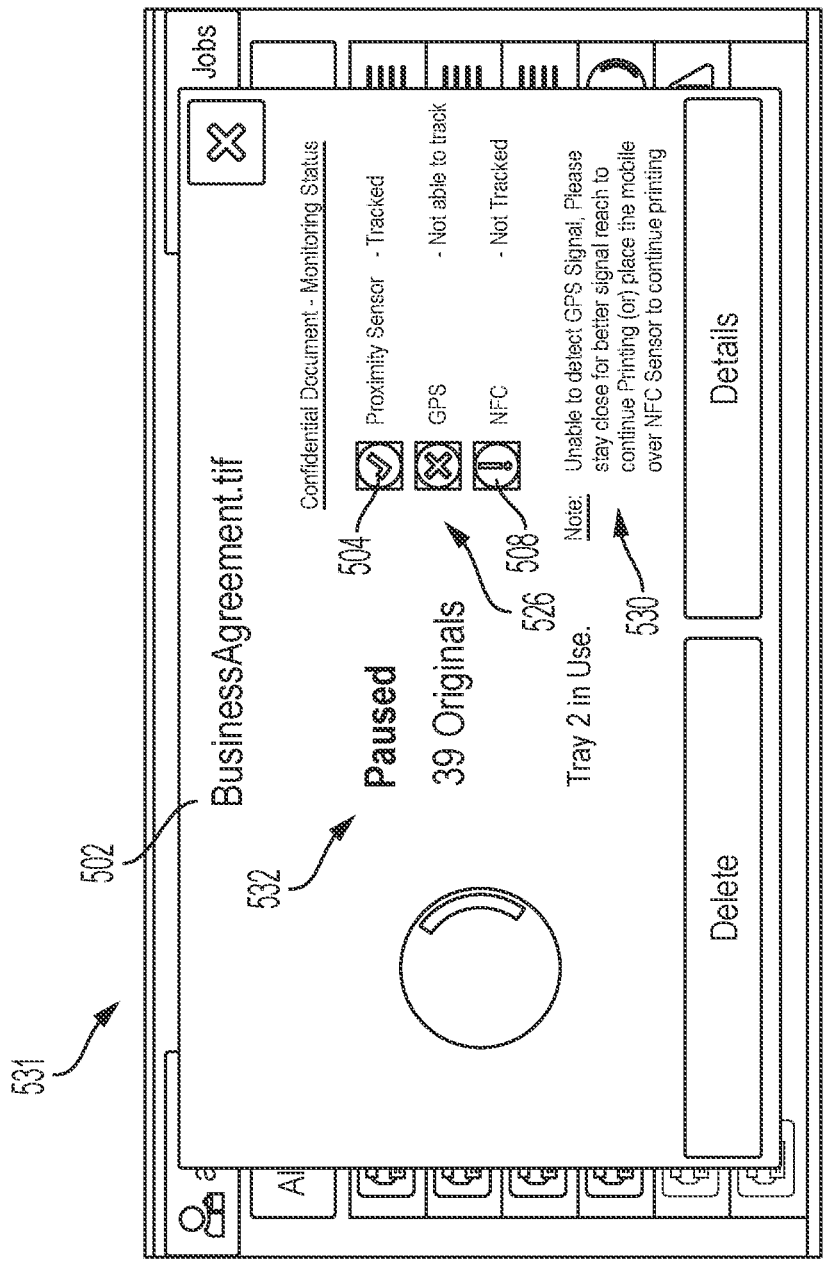
Figure 5C:
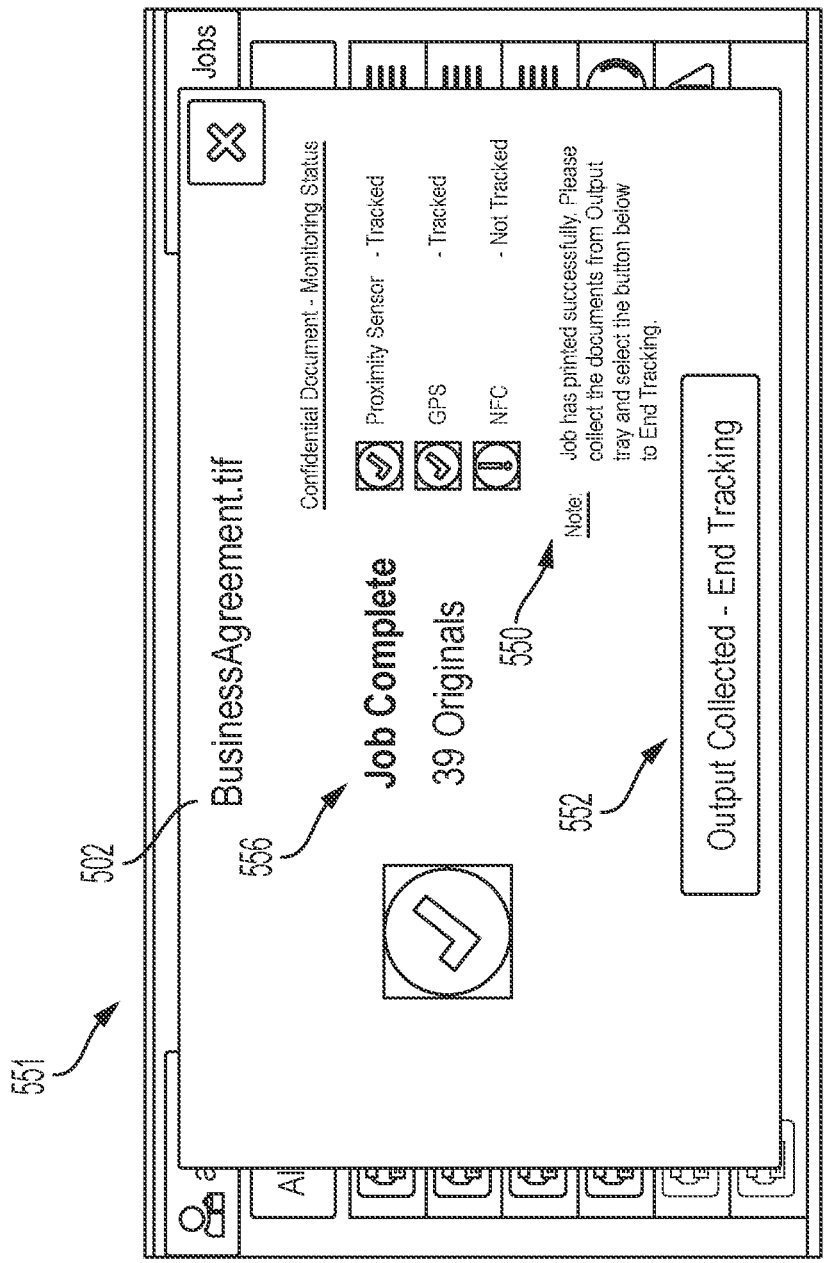

Exemplary snapshots indicating the progress of a document and its monitoring status at a multi-function device such as 102 are shown in FIGS. 5A-5C. The snapshot 500 of FIG. 5A shows a document titled—business agreement (marked as 502) and, where user of the document is tracked using proximity sensor and his registered device is tracked using GPS sensor or NFC sensor. As clearly shown in FIG. 5A the status of proximity sensor is shown as tracked (shown as a tick mark, marked via 504), the status of GPS sensor is shown as tracked (marked as 506) but the status of the NFC sensor is shown as not tracked (marked as 508). The status tracked 504 indicates that the user is present near the multi-function device, the status 506 indicates that the user registered device is present near the multi-function device 102. The status of NFC sensor 506 is shown as not tracked as the user registered device is already tracked using GPS sensor or various other reasons. Based on the detection of both the user and the user registered device, printing is continued as shown via marking 512. Further, a pre-defined message such as 510 is shown to the user such that the user and his registered device stays near the multi-function device. While the document printing is continued, the printed document is output in an output tray such as tray 2, marked as 514 in the snapshot 500.

If any of the user or the user registered device is not detected/present near the multi-function device, then printing the document is paused. As shown in the snapshot 531 of FIG. 5B, the user is tracked using proximity sensing (shown as 504), but the user registered device is not tracked using GPS sensing, the status "not able to track" (shown as cross, marked via 526) indicates that the user registered device is away from the multi-function device and hence the GPS sensor is not able to track the device. Then, printing is paused (marked as 532). Further, a pre-defined message such as 530 is shown to the user. The pre-defined message 530 indicates that the multi-function device is unable to detect GPS signals and further requests the user to stay closer to the multi-function device. The multi-function device continuously tracks the user registered device using GPS sensor and upon successful detection of GPS signals, printing of the document is resumed and continued till completion and collection by the user as shown in the snapshot 551 of FIG. 5C. As per FIG. 5C, the status of the job is shown as complete (shown via marking 556) and a pre-defined message 550 is shown to the user. The pre-defined message 550 indicates that the job is printed successfully, and the printed documents can be collected from the output tray. The pre-defined message further requests the user to select the button below to end tracking. The user can select the option marked as 552 to end the tracking. The multi-function device then stops tracking the user and the user registered device.

Figure 7:
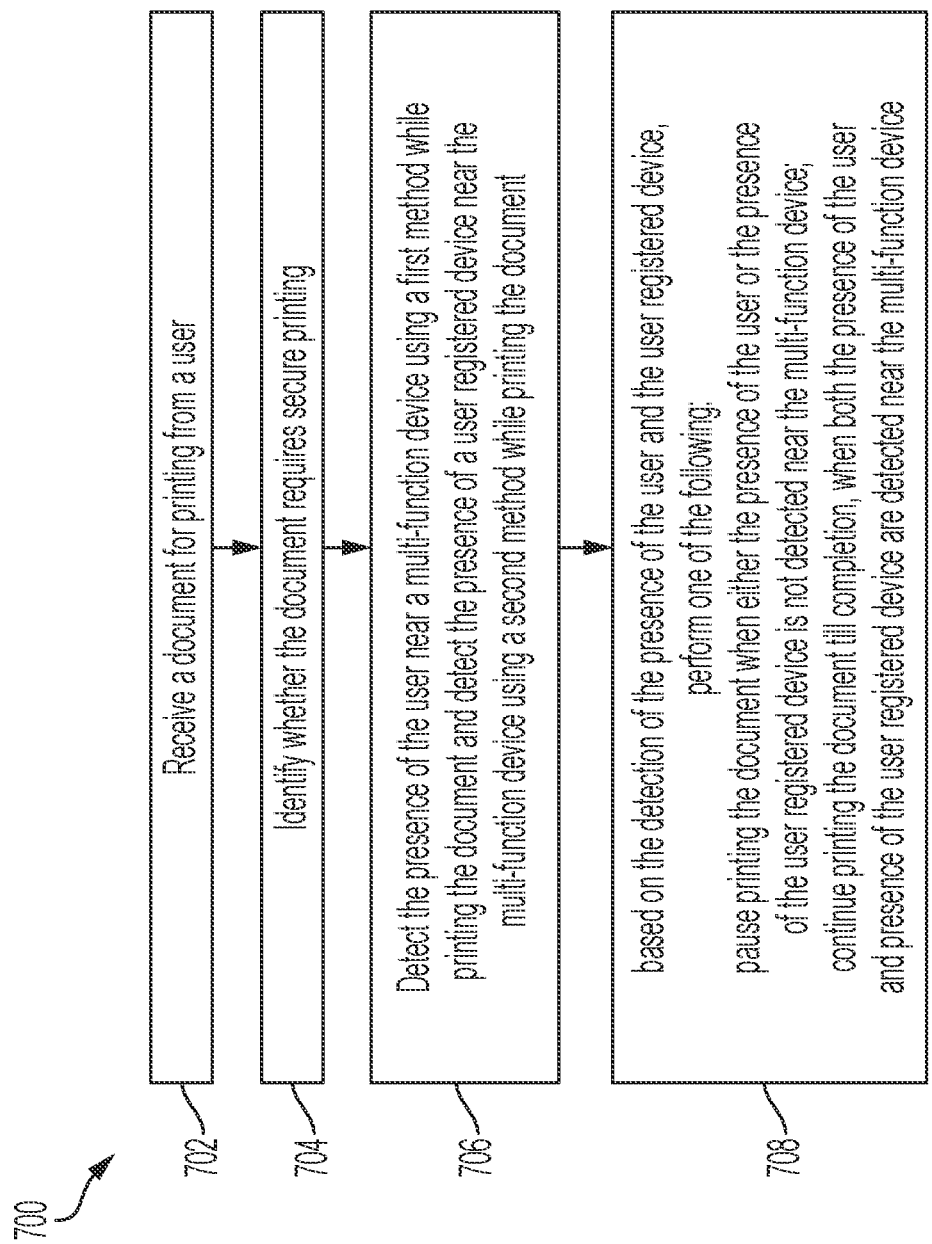
FIG. 7 is a method flowchart for providing secure printing while printing a document.

FIG. 7 is a method flowchart 700 for providing secure printing while printing documents such as confidential documents. At 702, a document for printing is received from a user. It is then identified whether the document requires secure printing at 704. Based on the detection, the method 700 proceeds further. For example, if the document requires secure printing, the method blocks 706, and 708 are executed. Otherwise, the method 700 proceeds with conventional ways of printing the document.

Once identified, then security feature is activated to track the user and the user registered device. Then, the user inputs his credentials to initiate printing the document. Here, printing the document is initiated/started based on the presence of the user (tracked via first method) and the presence of the user registered device (tracked via second method) near the multi-function device. It is considered that printing the document is initiated successfully. Further, the user and the user registered device is continuously tracked till completion and collection. More details will be discussed below.

At 706, the physical presence of the user is detected near the multi-function device using a first method such as proximity sensing while printing the document and the presence of the user registered device is detected near the multi-function device using a second method while printing the document. Various examples of the second method to detect the presence of the user registered device may be GPS sensing, NFC sensing or a combination thereof. Based on the detection of the presence of the user and the presence of the user registered device near the multi-function device, perform one of the following—either continue printing the document or pause printing the document at 708. In detail, printing of the document is continued when both the user and the user registered device are found present near the multi-function device. But printing of the document is paused if either the user or the user registered device is not found present near the multi-function device. For example, if the user is found present near the multi-function device but the user registered device is not found near the multi-function device, printing is paused. In another example, if the user's presence is not detected near the multi-function device but the user registered device is found present near the multi-function device, then also printing the document is paused. This way the method 700 secures the document from beginning of printing the document till the completion of printing the document by ensuring that both the user and the user registered device are present near the multi-function device.

For the sake of clarity, an example is discussed here. According to the example, it can be considered that the user submits a document having 10 pages for printing to a multi-function device such as 102. The user selects the option as discussed. The multi-function device receives all details from the user such as the document, and the selection of the option. The multi-function device starts tracking the user and his device. If either—the user or his device is not detected near the multi-function device, the multi-function device does not start printing the document.

If both are present near the multi-function device, then printing the document is initiated. It can be considered that page 1 is printed. While printing further pages of the document, the multi-function device continuously keeps tracking the user and his device and based on the presence of both, the multi-function device continues printing further pages of the document. This way, all pages are printed. But if at any point, the multi-function device finds that the user, his device, or both are not present near the multi-function device, the multi-function device pauses printing. It can be considered that pages 8 are printed, and the multi-function device pauses printing page 9 as the user device is not present near the multi-function device. The multi-function device keeps tracking the user device and it can be considered that the user device is detected again near the device, say after 5 minutes, (here the user is already present near the multi-function device), then printing is resumed. The multi-function device then resumes printing from page 9 and further continues printing page 10. This way, the document is printed completely and output in an output area or an output tray. The user collects his printed document. Once collected, the multi-function device automatically stops tracking the user and the user registered device.

The present disclosure can be implemented for any organization or individuals where documents require secure printing. The disclosure is very useful in environments in which security is important, for example, health care, legal or the like.

The methods and systems provide secure printing while printing documents such as confidential documents. The methods and systems secure the document from the beginning of printing the document till completion of printing and collection by the user. The methods and systems secure the document by ensuring that the user is present near a multi-function device and further ensures that the user present near the multi-function device is the user who submits the document for printing by detecting the presence of his registered device. Thereby, any unwanted peeking into the printed document by other users who are also present around the multi-function device is avoided. The methods and systems further offer 2-way and 2-type of monitoring and double ensures that no content of the document is read/seen/stolen/accessed by any other user. This way, the confidential document of the user can be kept confidential always until the user has printed output in his hand. The methods and systems avoid all scenarios where the user may forget and leave the printed document at the multi-function device or miss the printed document accidentally. The methods and systems enhance security while the document is getting printed at the multi-function device till completion such that the printed document is visible/accessible/read/seen/only by the user who submits the document for printing.

The methods and systems ensure that the document is not printed at the multi-function device even if the user has released the document at the device without the user's presence near the multi-function device. The additional security layer ensures that the user is present near or close to the multi-function device such that the user can continuously keep monitoring the printed content not being seen/stolen/read/accessed by other users. The methods and systems allow the user to tag the document as confidential and based on that tagging, the multi-function device automatically starts tracking the user and the user registered device while the document is printing.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as receiving, tracking, detecting, pausing, continuing, printing, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for securing documents while printing the documents, the method comprising:
    providing a multi-function device for:
        receiving a document for printing from a user;
        identifying whether the document requires secure printing;
        based on the identification that the document requires secure printing:
            authenticating the user to initiate printing of the document; and
            continuously detecting the presence of the user near the multi-function device using a first method while printing the document and further detecting the presence of the user registered device near the multi-function device using a second method while printing the document; and
        based on the detection of the presence of the user and the user registered device, performing one of the following:
            pausing printing the document when either the presence of the user or the presence of the user registered device is not detected near the multi-function device; and
            continue printing the document till completion, when both the presence of the user and the presence of the user registered device are detected near the multi-function device.

2. The method of claim 1, further comprising, displaying an initial alert to the user while initiating printing of the document.

3. The method of claim 1, further comprising, sending an alert to the user registered device when either the presence of the user or the presence of the user registered device is not detected near the multi-function device.

4. The method of claim 1, further comprising, continuously tracking the presence of the user and the user registered device till the document is printed completely and collected by the user.

5. The method of claim 1, further comprising, activating a security function of the multi-function device based on the identification of the document requiring secure printing.

6. The method of claim 1, further comprising, resuming printing the document when both the presence of the user and the presence of the user registered device are detected again near the multi-function device.

7. The method of claim 1, further comprising, stop tracking the user and the user registered device when the document is printed completely and collected by the user.

8. The method of claim 1, further comprising, providing an alternate option to the user to track the user registered device, when the user registered device is not detected near the multi-function device.

9. The method of claim 1, further comprising, initiating printing of the document when both the presence of the user and the user registered device is detected near the multi-function device.

10. A method for secure printing at a multi-function device, the method comprising:
    identifying whether a document received from a user requires secure printing;
    based on the identification that the document requires secure printing:
      initiating printing the document; and
      continuously tracking the presence of the user and a user registered device near the multi-function device; and
    based on the presence of the user and the user registered device, either continuing printing the document till completion and collection by the user or pausing printing the document.

11. The method of claim 10, wherein tracking comprises checking if the user and the user registered device are within a pre-defined range of the multi-function device.

12. The method of claim 10, wherein continuing printing the document comprises continue printing the document when both the user and the user registered device are within a pre-defined range of the multi-function device.

13. The method of claim 10, wherein pausing printing the document comprises pausing printing the document when either of the user or the user registered device is out of a pre-defined range of the multi-function device.

14. The method of claim 13, further comprising, resuming printing the document when both the user and the user registered device are found again within a pre-defined range of the multi-function device.

15. A multi-function device for securing documents while printing the documents, the multi-function device comprising:
    a controller for:
      identifying whether a document requires secure printing;
      based on the identification that the document requires secure printing:
        authenticating a user to initiate printing of the document;
        initiating printing of the document; and
        continuously tracking the presence of the user and a user registered device near the multi-function device, based on an input from a first sensor and one or more second sensors; and
      based on the tracking, performing one of the following:
        pausing printing the document when either the presence of the user or the presence of the user registered device is not detected near the multi-function device; and continuing printing the document till completion, when both the presence of the user and presence of the user registered device are detected near the multi-function device;
    the first sensor for detecting the presence of the user near the multi-function device while printing the document; and the one or more second sensors for detecting the presence of the user registered device near the multi-function device while printing the document.

16. The multi-function device of claim 15, wherein the controller is for sending an alert to the user registered device when either the presence of the user or the presence of the user registered device is not detected near the multi-function device.

17. The multi-function device of claim 15, wherein the controller is for continuously monitoring the presence of the user and the presence of the user's registered device till the document is printed and collected by the user.

18. The multi-function device of claim 15, wherein the controller is for stop tracking the user and the user registered device when the document is printed completely and collected by the user.

19. The multi-function device of claim 15, further comprises, a user interface for providing an alternate option to the user to track the presence of the user registered device, when the presence of the user registered device is not detected near the multi-function device.

20. The multi-function device of claim 15, wherein the controller is for activating a security feature of the multi-function device based on the identification whether the received document requires secure printing.

21. The multi-function device of claim 15, wherein the controller is for initiating printing the document when both the presence of the user and the presence of the user registered device is detected near the multi-function device.

* * * * *